(12) United States Patent
Cording

(10) Patent No.: US 7,895,844 B2
(45) Date of Patent: Mar. 1, 2011

(54) METHOD AND A SYSTEM FOR FILLING A REFRIGERATION SYSTEM WITH REFRIGERANT

(75) Inventor: Louis Cording, Sønderborg (DK)

(73) Assignee: Agramkow Fluid Systems A/S, Sonderborg (DK)

( * ) Notice: Subject to any disclaimer, the term of this patent is extended or adjusted under 35 U.S.C. 154(b) by 198 days.

(21) Appl. No.: 11/721,177

(22) PCT Filed: Dec. 14, 2005

(86) PCT No.: PCT/DK2005/000789
§ 371 (c)(1),
(2), (4) Date: Jul. 24, 2007

(87) PCT Pub. No.: WO2006/066580
PCT Pub. Date: Jun. 29, 2006

(65) Prior Publication Data
US 2008/0216492 A1    Sep. 11, 2008

(30) Foreign Application Priority Data

| Dec. 14, 2004 | (DK) | ................... | 2004 01933 |
| Mar. 10, 2005 | (DK) | ................... | 2005 00357 |
| Jun. 1, 2005 | (DK) | ................... | 2005 00797 |

(51) Int. Cl.
*F25B 45/00* (2006.01)
(52) U.S. Cl. .............. 62/77; 62/149; 62/174; 62/292
(58) Field of Classification Search .............. 62/77, 292, 62/149, 174
See application file for complete search history.

(56) References Cited

U.S. PATENT DOCUMENTS

| 5,076,063 | A | * | 12/1991 | Kamegasawa et al. | ......... 62/48.2 |
| 5,186,017 | A | | 2/1993 | Hancock et al. | |
| 5,187,942 | A | * | 2/1993 | Komatsu et al. | ............. 62/149 |
| 6,112,532 | A | | 9/2000 | Bakken | |
| 6,434,953 | B2 | * | 8/2002 | Bimboes et al. | ............... 62/77 |
| 2001/0025496 | A1 | | 10/2001 | Bimboes et al. | |

FOREIGN PATENT DOCUMENTS

| EP | 0860309 A2 | 8/1998 |
| EP | 1 143 213 A1 | 1/2001 |
| JP | 2004163037 | 6/2004 |
| JP | 2004163037 A | 6/2004 |
| WO | PCT/US88/03485 | 5/1989 |
| WO | 2004051162 A1 | 6/2004 |

OTHER PUBLICATIONS

International Search Report.
Filling in Workshop and Production Agramkow—The Safe Choice; Feb. 13, 2003, pp. 1-34.

* cited by examiner

Primary Examiner — Cheryl J Tyler
Assistant Examiner — Justin Loffredo
(74) Attorney, Agent, or Firm — William J. Sapone; Coleman Sudol Sapone P.C.

(57) ABSTRACT

According to the invention, there is described a method and a system which use a compressor (4) for filling $CO_2$ into an air conditioning system (18) via an oil filter (5) and a gas cooler (6). $CO_2$ may be pumped to an internal pressure container (11), and from there the air conditioning system (18) may be filled with $CO_2$ in gas form via valves (15). The fill system may additionally include a heat exchanger (9), so that a temperature may be controlled in the pressure container (11) so that it does not exceed 31.8 C, whereby $CO_2$ may be filled into the air conditioning system (18) in liquid form.

2 Claims, 1 Drawing Sheet

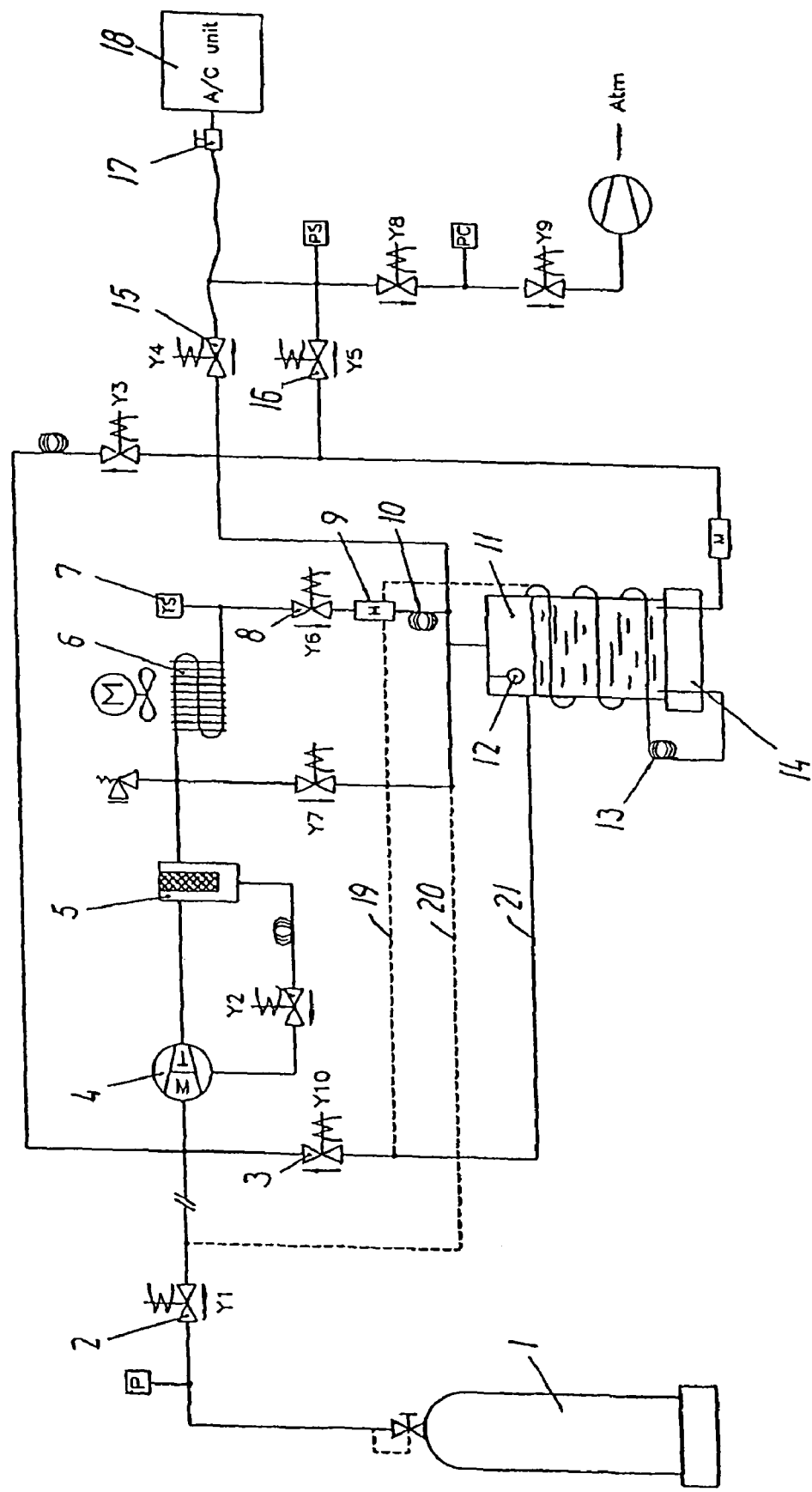

METHOD AND A SYSTEM FOR FILLING A REFRIGERATION SYSTEM WITH REFRIGERANT

THE PRIOR ART

The invention relates to a method of filling refrigerant, such as $CO_2$, into a refrigeration system, such as an air conditioning system in a vehicle, from an external pressure bottle to an internal pressure bottle in which the filled amount of $CO_2$ is recorded prior to the filling, as well as a system for performing the method.

Systems for filling refrigerant, such as $CO_2$, from an external pressure bottle into an air conditioning system are known.

The problem of the filling of $CO_2$ is that it is very volatile in the usual temperature range between 10 and 50° C., which constitutes the "over-critical" temperature range, whose range is above 31.8° C., where $CO_2$ cannot be compressed to a liquid, but is in gas form.

Filling therefore involves the problem that the refrigerant may be either liquid or gas depending on the temperature. This necessitates systems which use either liquid or gas.

WO 89/03963 discloses a system for the filling of refrigerants, where the critical point of the refrigerant about 100° C. or above is higher than the ambient temperature, which is typically 10-60° C.

This is not the case with $CO_2$, where the critical point is 31° C. Therefore, it is not possible to condition $CO_2$ in this known system, as the pressure in the container cannot get below the critical point and thereby cause $CO_2$ to assume liquid form.

Accordingly, the system can only operate in gas form, but not in liquid form for refrigerants, whose critical point is higher than the ambient temperature.

Further, U.S. Pat. No. 5,186,017 discloses a system whose circuits may be filled in gas form, but not in liquid form.

THE OBJECT OF THE INVENTION

The object of the invention is to ensure the physical conditions and thus that refrigerant is filled in either liquid form or gas form, and that it is ensured that the filling is precise in both states of the refrigerant.

This is achieved according to the invention by a method, in which the filling either takes place in gas form in that the filling pressure is established by means of a compressor, whereby $CO_2$ in a heated state is conveyed through an oil filter, a gas cooler and a valve to the internal pressure bottle, following which the $CO_2$ gas is returned via a pressure reduction unit and a valve for expansion for return flow at a lower pressure to the compressor, said circulation being maintained until a given temperature and weight have been achieved in the internal bottle, following which the actual filling of the air conditioning system begins by closing the valve, stopping the compressor and opening a valve for filling the system, until the weighing unit of the internal bottles records that the desired gas amount has been filled, or the filling takes place in gas form in that the compressor sucks $CO_2$ out of the external $CO_2$ bottle, whereby it is conveyed in a compressed and heated form to the gas cooler and an internal heat exchanger for heat exchange with the gas from the internal pressure bottle, whereby the gas expands through the pressure reduction unit for cooling below 31.8° C. and thereby partly condenses to liquid which is conveyed to the internal bottle, from which it is sucked back to the compressor such that $CO_2$ is sucked in from the external bottle, and such that the temperature in the internal bottle is kept below 31.8° C., following which filling of the system may be established when the necessary amount of $CO_2$ in the internal bottle is present.

This eliminates the known drawback of filling with gas that there is a so-called "dead" amount of gas in the connecting line between the internal refrigerant source and the system, which may vary much depending on temperature and pressure.

In case of liquid filling, the corresponding liquid amount will just depend on the temperature expansion of the liquid.

The great advantage of the method is that it is possible to select between filling with liquid or gas in an expedient performance of the method comprising the components necessary for this. This saves construction of various systems, and an advantage in terms of use is achieved by combining the two states in a system.

When, as stated in claim 2, a system is used for gas filling in which a suitable recirculation of the gas may be carried out, accurate filling is ensured at a specific temperature and weight, whereby the filling is controlled and as predetermined.

Finally, it is expedient, as stated in claim 3, to use a system in which a suitable amount of liquid refrigerant may be filled, which is ensured by using an internal pressure bottle for filling a specific liquid amount, which may be filled from there into the refrigeration system.

THE DRAWING

A example of a method and a system for performing the method will be described more fully below with reference to the drawing, which shows a diagram of the components included in the system and their mutual connections.

DESCRIPTION OF AN EXEMPLARY EMBODIMENT

An example of a system according to the invention is shown in the drawing, said system comprising a connected external pressure bottle 1, from which the $CO_2$ required for the filling is sucked out by means of a compressor 4.

Further, an oil filter 5, a gas cooler 6 and an internal pressure bottle 11 with a level sensor 12 and a weighing unit 14 as well as a pressure reduction unit 13, a magnetic valve 3 and a return line to the low pressure side of the compressor are mounted on the pressure side of the compressor 4.

Moreover, a pipe connection is provided between the internal pressure bottle 11 via a valve 15, a coupling 17 to the connected air conditioning system 18 which is to be filled with refrigerant.

The method will now be described with filling of $CO_2$ in gas form.

The system is connected to the internal pressure bottle 1 with $CO_2$ and the refrigeration system 18 via a coupling 17.

The valve 2 is opened, the compressor 4 is started, and $CO_2$ is sucked from the bottle 1 and is compressed, whereby it is heated.

The heated $CO_2$ is conveyed further on through an oil filter 5 and a gas cooler 6 and via a valve 8 to the internal bottle 11.

$CO_2$ is returned via the pressure reduction valve 13 and the valve 3 through the line 21 to be expanded at a lower pressure back to the compressor 4.

This circulation is maintained until a given temperature and pressure have been achieved, which is recorded by sensors 7 and the weighing unit 14.

Then the actual filling of the system 18 is started in that the valves 2, 8 and 3 are closed, the compressor 4 is stopped, while the valve 15 is opened, whereby $CO_2$ via the coupling 17 is filled into the system 18.

The weighing unit 14 records when the desired gas amount has been filled, and then the valve 15 is closed, and the filling has been completed.

The process may be repeated as needed, until the necessary refrigerant amount has been filled into the system 18.

The method of filling refrigerant in liquid form will now be described.

The valve 2 is opened and the compressor 4 is started, whereby $CO_2$ is sucked out of the bottle 1 via the line 20 and the valve 3, whereby $CO_2$ is compressed and heated.

The heated $CO_2$ is then cooled partly in a gas cooler 6 and additionally in the internal heat exchanger 9 by heat exchange with the gas from the internal container 11 by return flow through the line 19.

The gas is then expanded through the pressure reduction valve 10, whereby the gas is cooled below the critical temperature of 31.8° C., whereby it condenses partly to liquid. By determining the capacity of the unit 10 the liquid may be cooled to a desired temperature.

The liquid is conveyed to the internal bottle 11, and the gas is sucked back by the compressor 4 via the valve 3 on the line 19.

$CO_2$ is thus sucked from the external bottle 1, and the temperature in the internal bottle 11 is kept below the critical temperature of 31.8° C.

When the desired amount of $CO_2$ is present in the container 11, which may be recorded by means of the weighing unit 14 and/or the level sensor 12, filling may begin.

The filling amount may either be weighed by means of the weighing unit 14 or another unit and takes place via the valve 16, until the desired refrigerant amount has been filled into the system 18.

In summary, it may be concluded that refrigerant in either gas or liquid form may be filled with the system according to the invention.

Neither a pump nor a heat generator is used for achieving the necessary filling pressure, but just a compressor.

The system ensures uniform conditions at each filling, and the "dead" volume will be the same before and after a filling.

The system is independent of which size the external pressure bottle 1 has, and, therefore, all available bottle sizes and types may be connected with the system.

The compressor may empty the external bottle, which is otherwise impossible without leaving a residual amount of the order of 50 to 95 volume percent.

Finally, by means of the compressor it will be possible to obtain an indication of the filling state of the refrigeration system before filling is started in that the system is emptied by means of the compressor.

Conclusively, it may thus be observed that either a gas or a liquid phase may be run with the system according to the invention, that it is possible to empty the supply bottle via the compressor, which will not be possible with other principles, such as heating members or filling directly from bottle. When filling directly from bottle there will, depending on the need for filling density in the air conditioning system, be a residual amount in the supply bottle of the order of 50%, which will be below 5% with the compressor, that a conditioning takes place by the use of a compressor such that the conditions at each filling are the same above the critical point, thereby allowing dispensing of an accurately metered filling amount in gas form via a weighing unit, that a heat exchanger, which is arranged after the gas cooler, ensures that conditioning may take place to a temperature which is lower than the ambient temperature, which is the critical quantity in this circuit using $CO_2$ as a refrigerant. This applies to refrigerants which have the critical point below the ambient temperature, and that a conditioning takes place using a compressor such that the conditions at each filling are the same below the critical point, which allows dispensing of an accurately metered filling amount in liquid form.

The invention claimed is:

1. A method of filling an air conditioning system in a vehicle with a weighed amount of a $CO_2$ refrigerant delivered selectively in either a gas or a liquid form, the method consisting essentially of:

providing a single $CO_2$ refrigerant supply source consisting of an external pressure bottle containing the $CO_2$ refrigerant as a gas, with no heating of the external pressure bottle;

providing an internal pressure bottle into which an amount of $CO_2$ refrigerant is deposited;

locating the internal pressure bottle on a weighing unit for recording the amount of refrigerant deposited in the internal bottle prior to filling the air conditioning system;

when the $CO_2$ refrigerant is selected for delivery in a gas form:

drawing the $CO_2$ refrigerant gas out from the supply source and pressurizing the $CO_2$ received from the supply source to a predetermined filling pressure using a compressor, which heats up the $CO_2$ refrigerant gas;

conveying the heated, pressurized $CO_2$ refrigerant gas through an oil filter, a gas cooler and a first valve for delivery to the internal pressure bottle;

passing a portion of the delivered $CO_2$ refrigerant gas through a pressure reduction unit and a second valve, the portion of $CO_2$ refrigerant expanded to form a lower pressure return gas which flows through the second valve to a low pressure inlet side of the compressor, for mixing with the refrigerant gas drawn from the supply source prior to entering the compressor for compression and circulation therethrough;

maintaining said refrigerant gas circulation until a desired temperature and weight of refrigerant gas has accumulated in the internal pressure bottle, whereupon the air conditioning system is filled by:

closing the first valve and the second valve;

stopping the compressor;

providing a fill valve in a line in fluid communication with the air conditioning system;

opening the fill valve and without using a pump, allowing the refrigerant to flow from the internal pressure bottle to the air conditioning system to fill the air conditioning system while monitoring the weighing unit to determine when a desired amount of the $CO_2$ refrigerant has been filled into the system, as indicated by the weighing unit;

and when the $CO_2$ refrigerant is selected for delivery in a liquid form;

drawing the $CO_2$ refrigerant gas out from the supply source and increasing a pressure of the $CO_2$ refrigerant gas received from the supply source to a predetermined filling pressure using the compressor, which heats up the $CO_2$ refrigerant gas;

conveying the heated, pressurized $CO_2$ refrigerant gas through the oil filter, the gas cooler and an internal heat exchanger for cooling the pressurized $CO_2$ refrigerant gas by exchange with a cooled $CO_2$ refrigerant gas returning from the internal pressure bottle before delivery of the returning gas through the second valve to the inlet side of the compressor;

expanding the cooled pressurized $CO_2$ refrigerant gas through the pressure reduction unit, the expansion cooling the expanded $CO_2$ refrigerant below 31.8 C, partly condensing the $CO_2$ refrigerant to form a liquid $CO_2$ refrigerant, conveying the liquid $CO_2$ refrigerant to the internal bottle, accumulating the liquid $CO_2$ refrigerant therein, while returning the uncondensed cooled $CO_2$ refrigerant gas through the internal heat exchanger and the second valve to the compressor, for mixing with the supply refrigerant gas prior to entering the compressor for compression and circulation therethrough;

maintaining said refrigerant gas circulation and a temperature in the internal bottle below 31.8° C. until a desired weight of liquid refrigerant has accumulated in the internal pressure bottle, whereupon the air conditioning system is filled by:

closing the first valve and the second valve;

stopping the compressor;

opening the fill valve and without using a pump, allowing the refrigerant to flow from the internal pressure bottle to the air conditioning system to fill the air conditioning system while monitoring the weighing unit to determine when a desired amount of the $CO_2$ refrigerant has been filled into the system, as indicated by the weighing unit.

2. A system for filling an air conditioning system in a vehicle selectively with a $CO_2$ refrigerant delivered for filling as either a gas or as a liquid the system consisting essentially of:

a single $CO_2$ refrigerant supply source consisting of an external pressure bottle containing the $CO_2$ refrigerant as a gas, with no heater provided for the external pressure bottle;

an internal pressure bottle into which an amount of $CO_2$ as either a gas or a liquid is deposited and accumulated;

a weighing unit for recording the amount deposited in the internal pressure bottle prior to filling the air conditioning system;

a compressor having an inlet connected to the external pressure bottle for withdrawing the $CO_2$ refrigerant in a gas form, and for pressurizing the $CO_2$ refrigerant gas;

a discharge of said compressor connected to an oil filter, a gas cooler and then through a first valve to the internal pressure bottle;

the internal pressure bottle having a return line connected to a pressure reduction unit and a second valve, the return line leading to a low pressure inlet side of the compressor, the $CO_2$ refrigerant expanded when passing through the pressure reduction unit to form a lower pressure return gas which connects to the low pressure inlet leading to the compressor, the return gas mixing with the supply gas received from the external pressure bottle for compression and circulation therethrough;

a fill line in fluid communication with the air conditioning system, a fill valve located between the internal pressure bottle and the air conditioning system, and, for selectively filling the air conditioning system with liquid $CO_2$ refrigerant, the system further comprises an internal heat exchanger for cooling the high pressure $CO_2$ refrigerant gas a pressure reduction unit whereby the gas is further cooled by passing therethrough to a temperature below 31.8 C, for partly condensing the $CO_2$ refrigerant to form a liquid $CO_2$ refrigerant which is accumulated in the internal pressure bottle, the compressor withdrawing an uncondensed, cooled portion of the $CO_2$ refrigerant gas received from the internal pressure bottle which passes through the internal heat exchanger for cooling the high pressure $CO_2$ refrigerant gas, whereby the return gas cools the high pressure gas before expansion and condensation, and the high pressure gas heats the return gas prior to return to the low pressure side of the compressor.

* * * * *